3,394,000
PROCESS FOR OBTAINING Al-Al₂O₃ STRUCTURES FOR NUCLEAR APPLICATIONS
Dante Gualandi, Perazzi, and Pierre Jehenson, Palazzi, Italy, assignors to European Atomic Energy Community (Euratom), Brussels, Belgium
No Drawing. Filed Mar. 24, 1966, Ser. No. 537,023
Claims priority, application Italy, Mar. 30, 1965, 2,966/65
6 Claims. (Cl. 75—206)

ABSTRACT OF THE DISCLOSURE

A method for producing sintered Al-Al₂O₃ products for nuclear applications, comprising the grinding of aluminum in the presence of a silicone, such as a silicone grease, and in an atmosphere which is maintained at a constant temperature, oxygen and humidity level.

---

The present invention refers to a method for fabricating Al-Al₂O₃ tubes, particularly sheaths for combustible nuclear elements of pressure tubes for nuclear reactors, and is directed particularly to a process for obtaining sintered products for said nuclear applications, which products possess a high uniformity as to the distribution of the Al₂O₃. As is known, the sheaths or pressure tubes of sintered Al-Al₂O₃ for nuclear reactors, hereafter called finished products, obtained by known fabrication methods possess certain heat characteristics at those operating temperatures, 300–500° C.; which are common in certain nuclear reactors, said temperatures being limited to assure a safe and wide use of said finished products in nuclear reactors, in view of the serious stress conditions and periods of use of the reactor.

It is a fact known that a sheath for a combustible element, said sheath internally containing a fission combustible and externally being in contact with a current of abductor fluid for the heat generated in the combustible, must have an elevated temperature in order to obtain increased efficiency; for example, for a combustible comprised of uranium carbide briquets or tablets, the temperature at the axis may exceed 1000° C. and the abductor fluid or refrigerant may assume temperatures of the order of 400–450° C. whereby the temperature on the sheath may reach values in the order of 400–450° C. with peaks up to 500° C.

The conditions of use of the reactor are furthermore such as to necessitate prolonged periods of resistance of the sheath, even in its hottest, its most highly stressed, and its weakest regions, such as at welds at the ends of the sheath.

In order to improve the mechanical resistance characteristics and the ductility of the Al-Al₂O₃ material comprising a sheath or strength tube, it is essential that said material possess maximum homogeneity as to internal structure, in addition to maximum purity of composition and uniformity of distribution throughout the aluminum matrix of the aluminum oxide content thereof which should be subdivided in fine particles.

A process for obtaining sintered products, hereafter called semi-finished, for the industrial fabrication of finished products of the above mentioned type has been described in patent No. 665,857 filed in Italy May 17, 1963, in the name of the same inventors as herein and having the title "Method for Producing Sintered Al-Al₂O₃ of High Purity for Nuclear Applications."

Such known process comprises, essentially starting with hyper-pure aluminum of 99.99% grade, followed by a pulverizing phase involving atomization from the molten state or pulverization by gun starting with metallic wire, a controlled oxidation phase of the obtained powder through grinding in containers of aluminum or its alloys and by grinding elements made of pure aluminum or its alloys, and finally a sintering phase for the oxidized powders.

The sintered products thus obtained are transformed through conventional fabrication methods into finished products distinguished by the commercial name Puroxal (trademark filed in Italy) by which they shall be referred to hereafter.

Puroxal products, notwithstanding the high final purity which is obtainable with the above mentioned commercial process, still possess a certain anisotropy of properties in the materials of which they are constituted, which limits their resistance and ductility under their conditions of use in a nuclear reactor.

The present invention has the object of providing finished products possessing improved characteristics of purity, resistance, and ductility, and these through a process which, as in the above mentioned Italian patent, permits a control and a graduation of the oxidation such as to obtain a more thorough and uniform distribution of the Al₂O₃ and a reduction in the sizes of the oxide particles.

It has been found that the use of a silicone, preferably a silicone grease, in the oxidation-by-grinding phase, as a grinding agent in substitution of those usually used, such as stearic acid or stearates, affects the uniformity of the oxidation thereby yielding a more uniform grinding of the aluminum powders and the better control of the speed of oxidation.

The process according to the present invention is characterized essentially by the fact that during the fundamental phase, and that is in the controlled oxidation phase of the powder through grinding, this operation is carried out using a silicone, preferably a silicone grease, as the grinding agent, and by the fact that the grinding itself is carried out in an atmosphere of air at ambient temperature under conditions of controlled temperature, oxygen content and humidity of the air, preferably through continual renewal of the air and maintenance of a constant temperature.

The process according to the invention is characterized essentially by the fact that it comprises the following phases:

Phase A.—Preferably using as starting material hyper-pure aluminum of 99.99% grade or pure aluminum of 99.9% grade, this is reduced to a powder in which the content of each impurity present must be maintained as low as possible, for example, less than 0.005% by weight, through atomization from the molten state or pulverization by gun starting with metallic wire, and thereafter the obtained powder is collected in respective sedimentation or filter chambers and in centrifugal separators made of aluminum or its alloys;

Phase B.—Proceeding to the classification of the obtained powder, there is provided a controlled oxidation of a pre-selected granulometric fraction until there is obtained the desired percentage of Al₂O₃, between 2 and 20%, by means of grinding in mills comprising containers made of aluminum or of its alloys and grinding elements also made of aluminum or its alloys (for example, roller mills made of aluminum with rollers made of aluminum) in order to avoid contamination by the materials which make up the mill; as lubricant or grinding agent there is used a silicone, preferably a silicone grease, and the grinding is carried out in an air atmosphere at ambient temperature with the air which contacts the powder being regulated as to its oxygen and humidity content and as to its temperature;

Phase C.—The powders thus obtained, having an Al₂O₃ percentage preferably between 2 and 20%, are finally subjected to a cold compression phase carried out preferably at a pressure in the order of 2 t./cm.$^2$;

Phase D.—This phase provides a stabilization for sintering the oxide and provides for hot-degassing which is carried out at a temperature included within 550 and 625° C., in a vacuum oven under a residual pressure between $10^{-2}$ and $10^{-5}$ mm. of Hg, for a period in the order of 10–30 hours, preferably 20–24 hours. A similar degassing process but carried out in a more restricted temperature range, from 550–600° C., is described in Italian Patent No. 639,356 of May 30, 1961;

Phase E.—The material is subjected to a hot compression preferably carried out at 600° C. under a pressure in the order of 5 t./cm.$^2$.

The thus obtained products are thereafter transformed into finished products through at least one extrusion operation eventually followed by a drawing operation, carried out by any known method.

According to one embodiment of the process, the grinding phase is carried out with a single initial addition of silicone or silicone grease, preferably in a quantity of 0.3% by weight.

According to another embodiment, during the entire grinding phase silicone or silicone grease is successively added from time to time.

The use of the silicone in the grinding phase of the process according to the present invention results in obtaining a particularly fine and homogeneous distribution of the fine $Al_2O_3$ particles in the aluminum matrix, which on the one hand provides for obtaining finished products, particularly tubes, of improved quality relative to their intended conditions of use, and on the other hand, the elimination of $Al_2O_3$ lumps which are normally present heterogeneously and in coarse form. Because of their good anti-adhesive properties, the silicones provide for an effective regulation and adjustment of the slow oxidation (phase B of the process), varying the oxidation time with good linear correlation between the noted parameters, as for example, 0.1% $Al_2O_3$/hour of grinding.

The use of silicone grease further results in greatly reducing the percentage of C in the finished product with consequent increase in the purity of the sintered material since the C is present prevalently in the form of $Al_4C_3$, a product which is easily decomposable. While a normal sample of SAP (commercial product $Al-Al_2O_3$) contains from 0.2% to 0.3% of C (corresponding to 0.8–1.2% of $Al_4C_3$), a sample of material composed of $Al-Al_2O_3$ according to the present process contains about 0.05–0.1% of C, corresponding only to 0.2%–0.4% of $Al_4C_3$, the presence of silicon (0.2–0.3% Si) which is substituted in place of $Al_4C_3$ not being in the least wise damaging.

The elevated purity imparted to the finished products obtained by the present invention and the controlled oxidation which is possible by virtue of the herein disclosed process improves their characteristics and the fabrication thereof is facilitated.

In the field of nuclear applications, the fabrication of tubes, particularly those destined to be used as shields of combustible elements, whether smooth or provided with longitudinal or helecoidal cooling fins, and strength tubes of large internal diameter, other advantages provided by this invention are the following:

(a) Elevated purity of the sintered product results in the elimination of surface defects and of the beginnings of internal or external ruptures in the finished products, (b) An improved general resistance to corrosion, (c) The obtaining of the most complicated forms (for example: sheaths with helecoidal external and internal fins), (d) A lower variation between the mechanical characteristics of said finished products because of the elevated purity of the material, but above all because of the higher level of controlled oxidation, (e) Furthermore, the capture cross-section for the thermal-neutrons is not increased by the use of silicone grease so that there is maintained a certain economy of neutrons relative to the normal materials comprising $Al-Al_2O_3$.

Following is described, in order to better illustrate the invention, a non-limiting example of the fabrication of nuclear combustible element sheaths according to the present process.

EXAMPLE I 50 kg. of 99.99% pure aluminum (Raffinal) was introduced into a melting oven, having an atomizer mounted ahead of a collecting and filtering chamber. The atomization was carried out at 700° C.; the analysis of the obtained powder gave the following results:

TABLE B

| | Percent by weight |
|---|---|
| Fe | 0.005 |
| Si | 0.003 |
| $Al_2O_3$ | 0.05 |

Controlled oxidation by grinding in the presence of silicone grease.—3 kg. of powder at a time together with 0.3% silicone grease was introduced into a horizontal rotary mill of light alloy Al-Mg with grinding elements (rollers) of the same alloy, and subjected to grinding at ambient temperature and with continual renewal of air during a total time of 70 hours. A constant temperature was maintained by means of a water spray exteriorly of the mill.

The resulting percentage of $Al_2O_3$ was 7%.

The percentage of Fe equalled 0.005%. (The test yield was about 95%).

Sintering.—The above mentioned percentage of oxidized powder was cold compressed into ingots of 2 kg. each, of 80 mm., at a pressure of 2 t./cm.$^2$. The ingots were subsequently placed in a vacuum oven for stabilization of the oxide and for de-gassing at a temperature of 600° C. for 22 hours under a residual (vacuum) pressure of $10^{-4}$–$10^{-5}$ mm. of Hg and then subjected to hot compression at a temperature of 600° C. under a pressure of 5 t./cm.$^2$; subsequently, after normal turning and pickling operations, the ingots were extruded from 80 mm. to a tube 61.5 x 26 mm. (extrusion ratio: 1.85) with a 500 ton horizontal press, at an extrusion temperature of about 575° C. and with an extrusion velocity of about 1 m./minute.

After a pre-heating of four hours at 575° C., the pre-extruded tube was subjected to a second extrusion, from the 61.5 x 26 mm. dimension to the final tube dimensions with external helecoidal fins (internal diameter of 25.5 mm., thickness of the tube: 1 mm.; 39 thermal fins of height equal to 1 mm.; 3 external position fins of height equal to 3 mm.). The extrusion ratio is 17.5 and extrusion was carried out with a 250 ton horizontal press at an extrusion temperature of about 575° C. and with an extrusion velocity of 7 m./minute.

The finished products thus obtained are finally pickled in soda (sodium carbonate) and washed in water.

The chemical analysis upon the finished product gave the following results:

TABLE B

| | | |
|---|---|---|
| $Al_2O_3$ | percent | 7.1 |
| Fe | do | 0.005 |
| Si | do | 0.25 |
| C | do | 0.05 |
| $H_2$ | p.p.m. | 3 |

A metalographic analysis upon the finished product demonstrates that the $Al_2O_3$ is finally and homogeneously distributed in the aluminum matrix analogously to that which has previously been observed with regard to the starting Puroxal powder.

A rapid traction test upon finished finned tubes gave the results listed in the following table.

TABLE C

| Temperature, °C: | Ultimate Tensile Strength, R (kg./mm.²) | 0.2% Yield Limit Strength, (kg./mm.²) | Elongation at Rupture percent Upon 5 Diameters, A5 percent |
|---|---|---|---|
| 20 | 25 | 15 | 13 |
| 450 | 6.5 | 6 | 8 |

A traction test carried out at analogous conditions upon analogous finned tubes of Al-Al₂O₃ containing 7% Al₂O₃, which were not obtained through use of silicone grease but rather according to the process of Patent 665,857, gave the following results:

TABLE D

| Temperature, °C: | R (kg./mm.²) | (kg./mm.²) | A5, percent |
|---|---|---|---|
| 20 | 26 | 18 | 8 |
| 450 | 7.5 | 6.5 | 4 | which, compared with those of the preceding table demonstrate that ductility characteristics of the material according to the present invention are notably improved.

It is to be understood that the preceding disclosure is not intended to limit the scope of the invention which is defined in the following claims.

What is claimed is:

1. A metallurgical process for producing structural metal intended for nuclear applications, said metal being composed of Al-Al₂O₃, said process comprising: pulverizing aluminum of at least 99.9% purity, oxidizing the resultant powder by grinding it, and during the grinding preventing said powder from coming into contact with bodies which could introduce impurities thereinto, adding a silicone grinding agent to said aluminum powder during the grinding thereof, said grinding being performed in an air atmosphere at ambient temperature, oxygen content and humidity level, maintaining said atmosphere at said ambient temperature, oxygen content and humidity level, cold compressing the oxidized powder and then subjecting the compressed powder to a sintering and a vacuum heat treatment and finally to a hot compression.

2. The process of claim 1, wherein the air in said air atmosphere is continually renewed during the grinding of said powder, and wherein said atmosphere is maintained at a constant temperature.

3. The process of claim 1 wherein said pulverizing is effected by atomization of molten aluminum or pulverization by gun of aluminum wire, the resulting powder being then purified so as to provide an impurity content in the resulting powder to less than 0.005% by weight, the powder being purified by its being collected in respective sedimentation and filter chambers and in centrifugal separators whose parts which contact said powder are made of aluminum or its alloys, the purified powder then being granulometrically sorted into respective uniform particle size groups, and thereafter maintaining said groups distinct from each other, then subjecting any of said groups of powder to said oxidizing, said oxidizing being performed until the powder has an Al₂O₃ content of between 2 and 20%, and after said oxidizing subjecting the oxidized powder to the steps of: a cold compression under a pressure in the order of 2 t./cm.², a stabilization of the compressed powder including sintering and hot degassing at a temperature between 550–625° C. and under a vacuum in the order of $10^{-2}$ to $10^{-5}$ mm. of Hg for a period of 10 to 30 hours, a hot compression of the stabilized powder at a temperature in the order of 600° C. and under a pressure in the order of 5 t./cm.², at least one extrusion of the stabilized product followed by a drawing step.

4. The process of claim 1, wherein said silicone is added in a quantity of up to 0.3% by weight.

5. The process of claim 1, wherein said silicone is added in a single quantity at the beginning of said grinding.

6. The process of claim 1, wherein said silicone is added at successive times during said grinding.

References Cited

UNITED STATES PATENTS 3,278,301    10/1966    Solomir et al. _____ 75—206

FOREIGN PATENTS 718,252    11/1954    Great Britain.

CARL D. QUARFORTH, *Primary Examiner.*

R. L. GRUDZIECKI, *Assistant Examiner.*